United States Patent [19]

Hakon

[11] Patent Number: 5,289,908
[45] Date of Patent: Mar. 1, 1994

[54] COMBINED CLUTCH AND BRAKE UNITS

[75] Inventor: Ian N. Hakon, Bedford, England
[73] Assignee: TI Interlock Limited, Bedford, England
[21] Appl. No.: 944,677
[22] Filed: Sep. 14, 1992

[30] Foreign Application Priority Data

May 22, 1992 [GB] United Kingdom ............ 9211030

[51] Int. Cl.⁵ ............................................ F16D 67/04
[52] U.S. Cl. ............................ 192/18 R; 192/113 AD
[58] Field of Search ............ 192/18 A, 18 R, 113 A, 192/12 C, 113 AD

[56] References Cited

U.S. PATENT DOCUMENTS

| | | | |
|---|---|---|---|
| 2,584,190 | 2/1952 | Danly et al. ............... | 192/18 A |
| 3,200,917 | 8/1965 | Herr et al. ................ | 192/18 A |
| 4,533,029 | 8/1985 | Weber ....................... | 192/18 A |
| 4,574,926 | 3/1986 | Bubak ....................... | 192/18 A |
| 4,693,350 | 9/1987 | Sommer ...................... | 192/18 A |
| 4,739,865 | 4/1988 | Yater et al. ............... | 192/18 A |
| 4,860,862 | 8/1989 | Yater et al. ............... | 192/18 A |

FOREIGN PATENT DOCUMENTS 0036645 9/1981 European Pat. Off. .
1149078 4/1985 U.S.S.R. .

Primary Examiner—Leslie A. Braun
Assistant Examiner—Andrea Pitts
Attorney, Agent, or Firm—Seidel, Gonda, Lavorgna & Monaco

[57] ABSTRACT

A cutting or bending machine has a combined clutch and brake mechanism cooled by air flow from an electrically powered impeller. A guide duct directs the air flow substantially uniformly through the entire volume of the combined clutch and brake mechanism, preferably to the outer peripheral edges of the mechanism, so that generated heat is dissipated continuously and the machine can be operated more productively. The impeller fan and the guide duct may direct the air flow either axially or radially of the mechanism and the air flow may be either inwardly or outwardly of the mechanism.

14 Claims, 3 Drawing Sheets

COMBINED CLUTCH AND BRAKE UNITS

FIELD OF THE INVENTION

The invention relates to combined clutch and brake units, such as are used in cutting and bending machines.

BACKGROUND OF THE INVENTION

Industrial cutting or bending machines typically operate by the transfer of energy stored in a rotating flywheel to a drive shaft by which the cutting or bending tool is moved through its operating cycle. The flywheel and shaft are coupled together when a cutting or bending operation is required by the closure of a clutch; when the operation has been completed, the drive shaft is braked to bring the machine back to a condition in which it is ready for another cutting or bending operation. Separate clutch and brake devices can be mounted for example at opposite ends of the drive shaft, or alternatively, a combined clutch and brake unit can be employed. Such combined units can be of compact design so that there is a substantial space saving as compared with separate clutch and brake devices. Moreover, the cost of the combination unit can be significantly less than that for the two separate devices.

It is of course normally desired to operate cutting and bending machines at the highest available production rate, but this places heavy demands on the clutches and brake devices in particular. A specific maximum torque is developed by frictional engagement of frictional material with metal surfaces, urged together by actuators. Considerable heat is necessarily generated in the process and the number of operations per minute that the machine is capable of sustaining can be limited by the amount of heat that can be dissipated.

It is accordingly an object of the invention to provide a combined clutch and brake unit from which heat could readily be dissipated, without substantial prejudice to the compactness and low cost of the unit.

SUMMARY OF THE INVENTION

The invention accordingly provides a combined clutch and brake unit incorporating forced air cooling arrangements, preferably in the form of one or more electrically powered centrifugal blower or axial flow fans to blow cool air into the unit or to extract hot air from it.

The clutch and brake unit typically has an axially short cylindrical shape receiving the drive shaft of the cutting or bending machine at its centre, and located adjacent the flywheel from which the energy for driving the shaft is derived. The cooling airflow in accordance with the invention is preferably directed either generally radially of the unit or generally axially by a suitable guide duct extending between the fan outlet and the unit. With radial airflow, the guide duct can be arranged to distribute the airflow over a substantial portion of the curved outer periphery of the unit. With generally axially orientated airflow, the guide duct is preferably generally frustoconical and carries the airflow right out to the outer peripheral edge of one end face of the unit.

BRIEF DESCRIPTION OF THE DRAWINGS

The invention is further described below, by way of example, with reference to the accompanying drawings, in which.

DETAILED DESCRIPTION

Figure 1:
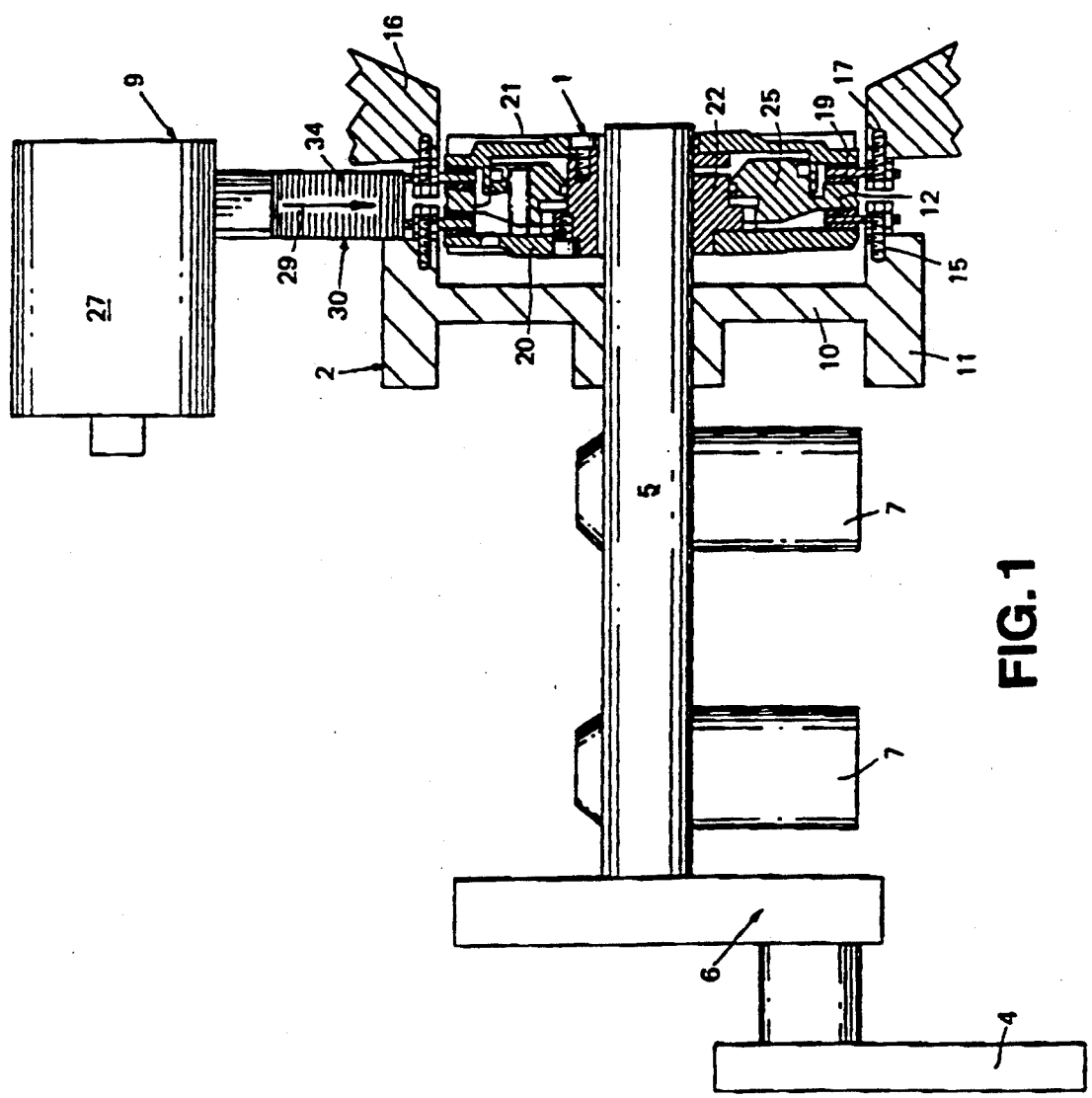
FIG. 1 is a part sectional, part schematic side view of a machine, which may be a cutting or a bending machine, incorporating a combined clutch and brake mechanism in accordance with the invention.
Figure 2:
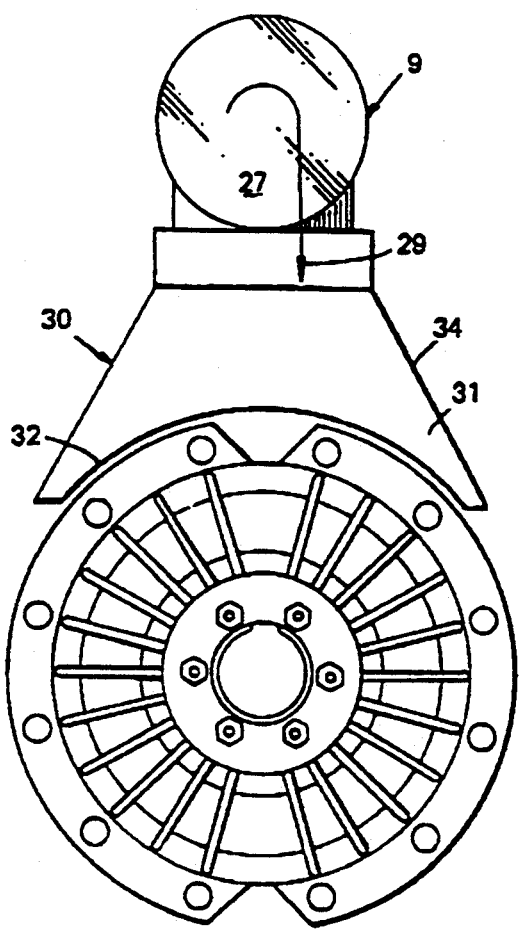
FIG. 2 is an end view of the machine of FIG. 1.

The apparatus illustrated in FIGS. 1 and 2 comprises a combined clutch and brake mechanism 1 adjacent a flywheel assembly 2. The flywheel assembly 2 is continuously rotated in use by an appropriate drive means (not shown) and the kinetic energy it stores can be applied by way of the unit 1 to a cutting or bending tool 4 through a drive shaft 5 and a crank mechanism 6. The combined clutch and brake unit 1 can also be actuated to effect braking of the drive shaft 5. In accordance with the invention, the unit 1 is cooled in use by a forced air cooling unit 9.

As best appears from FIG. 1, the flywheel assembly 2 is journalled on the drive shaft 5 between the clutch and brake unit 1 and a pair of axial spaced support bearings 7 for the shaft, beyond which the shaft extends to the crank mechanism 6.

The flywheel assembly 2 comprises a flywheel 10 with an enlarged rim 11 to which is concentrically secured an annular clutch plate 12 of the combined clutch and brake unit 1 by anchor bolts 15 spaced around the rim. An annular portion 16 of the frame of the machine directly opposes the flywheel rim 11 and is spaced from it. On the frame portion, further anchor bolts 17 mount an annular brake plate 19, similar to the clutch plate 12, in co-axial spaced relationship with it. The friction plates for both the clutch and brake consist of a pair of split semi-circular friction elements which aids installation and removal. They may be mounted by the ring to ring method using anchor bolts 15 as described or by the pin to pin or pin to extended pin method (not shown) wherein each pair of friction elements is fastened with extension arms and pins fitting into mating holes in the flywheel/frame portion. Clutch and brake discs 20 & 21 extend outwardly from a hub 22 splined to the shaft 5 and are juxtaposed at their outer edge portions to the outer sides of the clutch and brake plates 12 & 19 respectively. Between the clutch and brake discs 20 & 21, actuators 25 are provided which can be operated selectively to engage and disengage either the clutch disc 20 and plate 12, or the brake disc 21 and plate 19. The actuators 25 may comprise piston, airtube, rolling diaphragm, spring, hydraulic or electromagnetic actuators.

In use of the machine, the flywheel assembly 2 runs continuously. Between operations, the actuators 25 of the unit 1 are operative to hold the drive shaft 5 braked, typically at the top dead centre position of the crank mechanism 6. When a machine operation is to be effected, the actuators 25 are operated to release the brake and to couple the flywheel assembly 2 to the drive shaft 5, so that energy from the flywheel is transmitted by way of the mechanism 6 to the tool 4. When the operation has been completed, the shaft and flywheel assembly are decoupled and the actuators 25 are then operated to couple the drive shaft 5 to the brake disc 19, so that the tool is brought back to the rest position. In order to dissipate the heat that is necessarily generated during the braking operations, the forced air cooling unit 9 is operated preferably continuously.

The unit 9 comprises a centrifugal blower fan 27, powered by an electric motor, mounted on the machine frame so that the impeller of the blower fan directs air generally radially of the clutch and brake unit 1, as shown by arrow 29. To achieve effective distribution of the airflow, there is provided a guide duct 30 between the outlet of the blower fan 27 and the unit 1. The guide duct 30 comprises axially spaced parallel side walls 31 which extend closely towards the unit, between the flywheel rim 11 and the frame portion 16. Adjacent the unit 1, the walls 31 have arcuate edges 32 which follow the external contour of the unit. The sidewalls are connected at their side edges by end walls 34 which diverge from the blower fan to positions transversely of the drive shaft axis at least approximating to the outer diameter of the unit 1. By means of this guide duct 30, the cooling airflow is directed substantially uniformly into the interior of the unit, to provide effective cooling. Two or more of the units 9 can be located at angularly spaced positions around the unit 1 if required.

Figure 4:
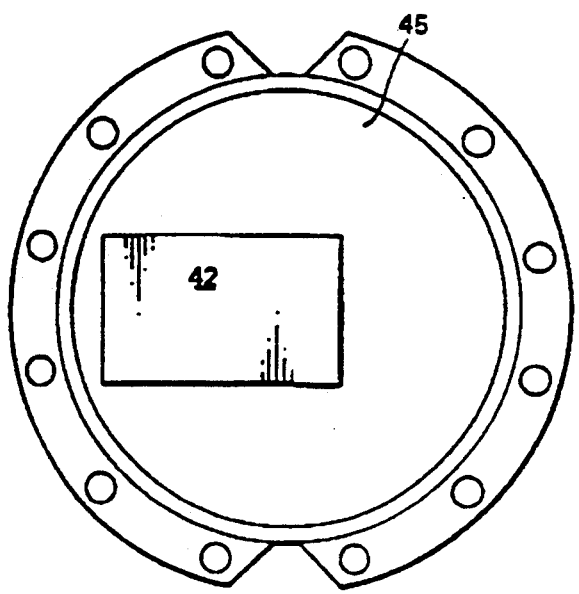
FIG. 4 is an end view of the apparatus of FIG. 3.
Figure 3:
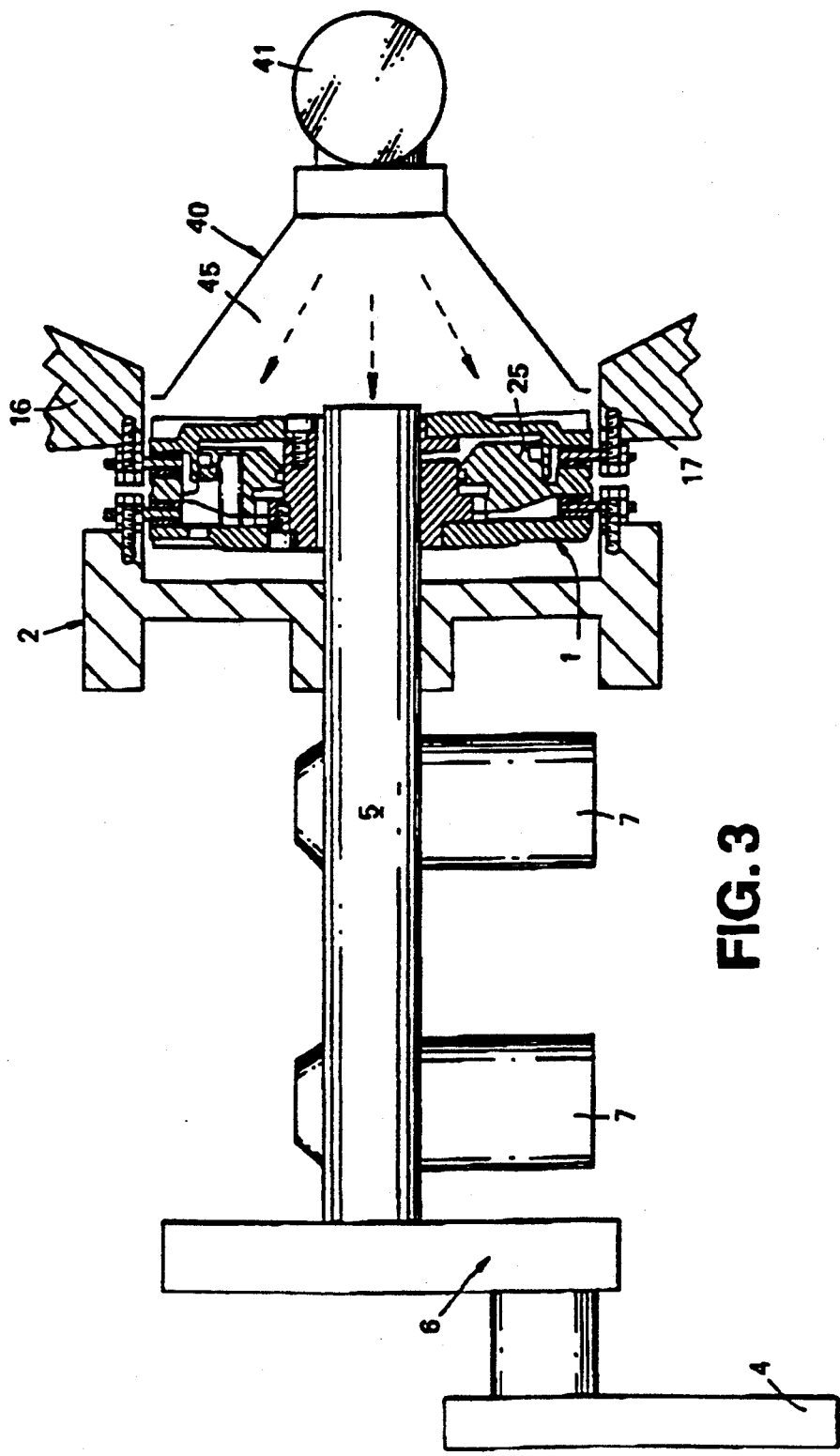
FIG. 3 is a view similar to that of FIG. 1 of the machine incorporating a modified form of the combined clutch and brake unit of FIGS. 1 and 2.

The machine of FIGS. 3 and 4 differs from that of FIGS. 1 and 2 only in respect of the former's forced air cooling unit 40, so in FIGS. 3 and 4, parts similar to parts shown in FIGS. 1 and 2 are indicated by the same reference numerals. The unit 4 also includes a centrifugal blower fan 41 driven by an electric motor 42, but the fan is mounted on the machine frame at a position generally on the axis of the drive shaft 5, on the side of the combined clutch and brake unit 1 remote from the flywheel assembly 2. The airflow from the blower fan 41 is directed generally axially towards the unit 1, but again a guide duct 45 is provided between the blower fan outlet and the unit. Here, the guide duct 45 is generally frustoconical, with its smaller diameter end at the blower fan outlet, and its larger diameter end extending at least approximately to the machine frame portion 16. The airflow is thus distributed effectively into the exposed end face of the clutch and brake unit 1 and can escape radially outwardly between the flywheel assembly 2 and the frame portion 16.

The invention can of course be embodied in a variety of ways other than as specifically described. For example, one or more axial flow fans could be employed instead of the centrifugal blower fans illustrated. The airflow may be in the contrary direction to that shown, that is, one or more suction fans can be employed to extract heated air from the clutch and brake unit.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. A cutting or bending machine comprising:
a machine frame,
an output drive shaft journaled on said machine frame,
a flywheel,
drive means for rotating said flywheel, and
a combined clutch and brake mechanism selectively operable to couple said flywheel to said drive shaft and to effect braking of said drive shaft,
an electrically powered centrifugal blower operable to provide an airflow, and
guide duct means directing said airflow through substantially all of said combined clutch and brake mechanism.

2. A cutting or bending machine comprising:
a machine frame,
an output drive shaft journaled on said machine frame,
a flywheel,
drive means for rotating said flywheel, and
a combined clutch and brake mechanism located between said flywheel and a portion of said machine frame spaced therefrom, said combined clutch and brake mechanism having an exterior and comprising:
a clutch plate secured to said flywheel,
a brake plate secured to said machine frame portion,
a clutch disc,
a brake disc,
means mounting said clutch disc and said brake disc for movement axially of said drive shaft and for rotation therewith,
actuator means for selectively engaging said clutch disc with said clutch plate and said brake disc with said brake plate,
an electrically powered centrifugal blower operable to provide an airflow, and
guide duct means located between said flywheel and said machine frame portion, said guide duct means for directing said air flow substantially uniformly over a substantial portion of said exterior of said combined clutch and brake mechanism.

3. A cutting or bending machine comprising:
a machine frame,
an output drive shaft journaled on said machine frame,
a flywheel,
drive means for rotating said flywheel, and
a combined clutch and brake mechanism located axially adjacent said flywheel and around said drive shaft and having an end face with an outer peripheral edge, said end face being remote from said flywheel, said combined clutch and brake mechanism comprising:
a clutch plate secured to said flywheel,
a brake plate secured to said frame,
a clutch disc,
a brake disc,
means mounting said clutch disc and said brake disc for movement axially of said drive shaft and for rotation therewith,
actuator means for selectively engaging said clutch disc with said clutch plate and said brake disc with said brake plate,
impeller means operable to provide an airflow in a direction substantially axially of said drive shaft, and
guide duct means comprising a generally frustoconical member for carrying said air flow substantially right out to said outer peripheral edge of said end face of said combined clutch and brake mechanism.

4. A cutting or bending machine comprising:
a machine frame,
an output drive shaft journaled on said machine frame,
a flywheel,
drive means for rotating said flywheel, and
a combined clutch and brake mechanism selectively operable to coupled said flywheel to said drive shaft and to effect braking of said drive shaft,
an axial flow fan operable to provide an airflow, and
guide duct means directing said airflow through substantially all of said combined clutch and brake mechanism.

5. A cutting or bending machine according to claim 4 wherein said axial flow fan is adapted to extract from said combined clutch and brake mechanism air heated by operation of said mechanism.

6. A cutting or bending machine comprising:
a machine frame,
an output drive shaft journaled on said machine frame,
a flywheel,
drive means for rotating said flywheel, and
a combined clutch and brake mechanism selectively operable to couple said flywheel to said drive shaft ar' 'o effect braking of said drive shaft, said combi_  ⌐ clutch and brake mechanism having an exterior,
at least two impeller means each operable to provide an airflow, said at least two impeller means being located at angularly spaced positions around said combined clutch and brake mechanism, and
guide duct means directing said airflows through substantially all of said combined clutch and brake mechanism, said guide duct means directing said airflows generally radially of said combined clutch and brake mechanism and over a substantial portion of said exterior of said combined clutch and brake mechanism.

7. A cutting or bending machine comprising:
a machine frame,
an output drive shaft journaled on said machine frame,
a flywheel,
drive means for rotating said flywheel, and
a combined clutch and brake mechanism selectively operable to couple said flywheel to said drive shaft and to effect braking of said drive shaft, said combined clutch and brake mechanism having an end face with an outer peripheral edge,
impeller means operable to provide an airflow, and
guide duct means directing said airflow through substantially all of said combined clutch and brake mechanism, said guide duct means comprising a generally frusto-conical member for directing said air flow ⌐enerally axially and to carry said airflow right oι_ .o said outer peripheral edge of said end face of said combined clutch and brake mechanism.

8. A cutting or bending machine comprising:
a machine frame,
an output drive shaft journaled on said machine frame,
a flywheel,
drive means for rotating said flywheel, and
a combined clutch and brake mechanism located between said flywheel and a portion of said machine frame spaced therefrom, said combined clutch and brake mechanism having an exterior and comprising:
a clutch plate secured to said flywheel,
a brake plate secured to said machine frame portion,
a clutch disc,
a brake disc,
means mounting said clutch disc and said brake disc for movement axially of said drive shaft and for rotation therewith,
actuator means for selectively engaging said clutch disc with said clutch plate and said brake disc with said brake plate,
an axial flow fan operable to provide an airflow, and
guide duct means located between said flywheel and said machine frame portion, said guide duct means for directing said air flow substantially uniformly over a substantial portion of said exterior of said combined clutch and brake mechanism.

9. A cutting or bending machine according to claim 8 wherein said axial flow fan is adapted to extract hot air from said combined clutch and brake mechanism.

10. A cutting or bending machine comprising:
a machine frame,
an output drive shaft journaled on said machine frame,
a flywheel,
drive means for rotating said flywheel, and
a combined clutch and brake mechanism located between said flywheel and a portion of said machine frame spaced therefrom, said combined clutch and brake mechanism having an exterior and comprising:
a clutch plate secured to said flywheel,
a brake plate secured to said machine frame portion,
a clutch disc,
a brake disc,
means mounting said clutch d'sc and said brake disc for movement axially of sυιd dri'˙ shaft and for rotation therewith,
actuator means for selectively ɛnɡ⌐ging said clutch disc with said clutch plate and said brake disc with said brake plate,
at least two impeller means operable to provide an airflow, said at least two impeller means being located at angularly spaced positions around said combined clutch and brake mechanism, and
guide duct means located between said flywheel and said machine frame portion, said guide duct means for directing said air flow substantially uniformly over a substantial portion of said exterior of said combined clutch and brake mechanism.

˙. A cutting or bending machine comprising:
nachine frame,
⌐n output drive shaft journaled on said machine frame,
a flywheel,
drive means for rotating said flywheel, and
a combined clutch and brake mechanism selectively operable to couple said flywheel to said drive shaft and to effect braking of said drive shaft,
electrically powered impeller means operable to provide ⌐⌐ airflow, and
⌐uide duct means directing said airflow through substantially all of said combined clutch and brake mechanism.

12. A cutting or bending machine according to claim 11 wherein said combined clutch and brake mechanism has a generally cylindrical outer periphery and wherein said guide duct means directs said airflow generally radially of said combined clutch and brake mechanism and over a substantial portio of said periphery of said mechanism.

13. A cutting or bending machine according to claim 12 further comprising at least one additional impeller means located at a position angularly spaced from said first-mentioned impeller means around said combined clutch and brake mechanism.

14. A cutting or bending machine comprising:
a machine frame,
an output drive shaft journaled on said machine frame,
a flywheel,
drive means for rotating said flywheel, and
a combined clutch and brake mechanism located axially adjacent said flywheel and around said drive shaft, said combined clutch and brake mechanism comprising:
a clutch plate secured to said flywheel,
a brake plate secured to said frame,
a clutch disc,
a brake disc,
means mounting said clutch disc and said brake disc for movement axially of said drive shaft and for rotation therewith,
actuator means for selectively engaging said clutch disc with said clutch plate and said brake disc with said brake plate,
impeller means operable to provide an airflow, in a direction substantially axially of said drive shaft, and
guide means for guiding said airflow to said combined clutch and brake mechanism, said guide duct means being located axially between said impeller means and said combined clutch and brake mechanism remotely from said flywheel.

* * * * *

UNITED STATES PATENT AND TRADEMARK OFFICE
CERTIFICATE OF CORRECTION

PATENT NO. : 5,289,908
DATED : March 1, 1994
INVENTOR(S) : Ian N. Hakon

It is certified that error appears in the above-indentified patent and that said Letters Patent is hereby corrected as shown below:

Claim 6, Col. 5, lines 28-30 should read --and to effect braking of said drive shaft, said combined clutch and brake mechanism having an exterior,--

Claim 7, Col. 5, lines 58-59 should read --air flow generally axially and to carry said airflow right out to said outer peripheral edge of said end--

Claim 10, Col. 6, lines 38-39 should read --means mounting said clutch disc and said brake disc for movement axially of said drive shaft and for--

Claim 11, Col. 6, lines 53-54 should read --11. A cutting or bending machine comprising:
a machine frame,
an output drive shaft journaled on said machine--

Claim 11, Col. 6, lines 62-64 should read --electrically powered impeller means operable to provide an airflow, and guide duct means directing said airflow through sub---

Signed and Sealed this

Eighth Day of November, 1994

*Attest:*

BRUCE LEHMAN

*Attesting Officer*  *Commissioner of Patents and Trademarks*